July 5, 1949.　　　　G. RAYMOND　　　　2,475,051
GROUND CONNECTOR FOR WELDING APPARATUS
Filed July 14, 1947
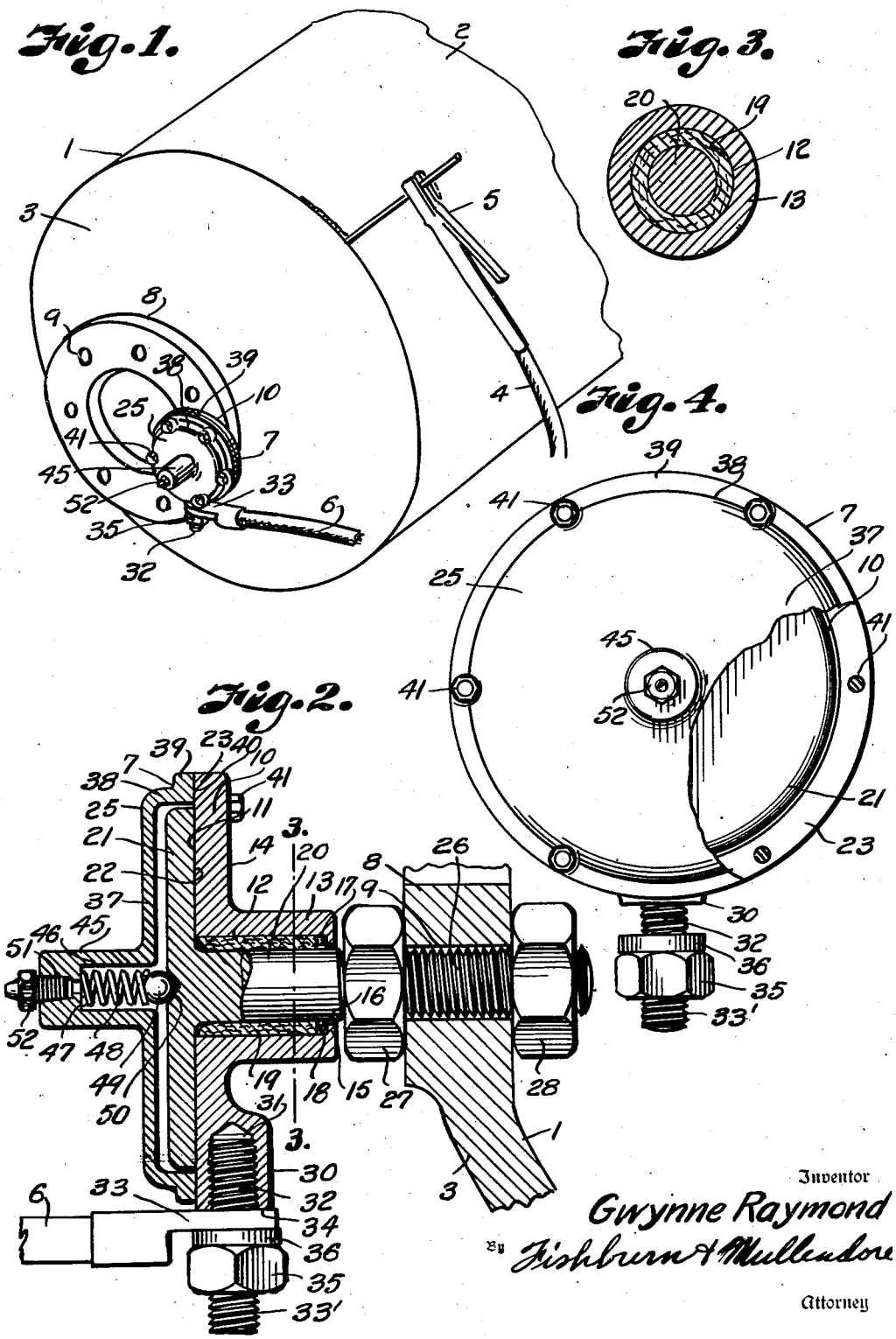
Inventor
Gwynne Raymond
By Fishburn & Mullendore
Attorney

Patented July 5, 1949

2,475,051

UNITED STATES PATENT OFFICE 2,475,051

GROUND CONNECTOR FOR WELDING APPARATUS

Gwynne Raymond, Oklahoma City, Okla., assignor to Black, Sivalls & Bryson, Inc., Kansas City, Mo., a corporation of Delaware Application July 14, 1947, Serial No. 760,862

4 Claims. (Cl. 173—324)

1

This invention relates to ground connectors for use in connecting the ground conductor or cable of an electrical welding apparatus to a work member that must be turned or rotated during welding operations and which has for its principal object to provide a connector of this character that prevents twisting of the ground conductor or cable and which successfully carries the welding current.

Other objects of the invention are to provide a swivel connector which is of simple and lasting construction, to provide a swivel connector with substantially large contact surfaces between the fixed and movable elements of the connector; and to provide sufficient pressure for maintaining the surfaces in contact without material resistance to rotation of one of the surfaces relative to the other when the work member is moved about or rotated during welding operations.

In accomplishing these and other objects of the invention hereinafter pointed out, I have provided improved structure, the preferred form of which is illustrated in the accompanying drawings wherein:

Fig. 1 is a perspective view of the electrical connector attached to a work member to prevent twisting of the ground conductor when the work member is turned during the welding thereof.

Fig. 2 is an enlarged section through the swivel connector and the portion of the work member to which it is attached.

Fig. 3 is a cross section through the swivel connector on the line 3—3 of Fig. 2.

Fig. 4 is a front elevational view of the swivel connector.

Referring more in detail to the drawings:

1 designates a work member, for example, a tank or vessel having a cylindrical wall 2 and a head 3 that is welded to the wall 2 by an electric welding apparatus including a conductor 4 that carries the welding rod clamp 5 and a ground connection conductor 6 that must be attached to a part of the tank to complete the welding circuit.

In welding of this character it is necessary to turn and rotate the work member so that the ground conductor 6 is subject to twisting and loosening of its connection with the work member. To avoid this difficulty, I have provided a swivel connector 7 that is adapted to be attached to a part of the work member, for example, to one of the flanges or fittings 8 thereof as shown in Fig. 1. Such flanges or fittings provide convenient connections for the reason that they are usually equipped with openings 9 to which the swivel connector may be rigidly connected. The

2 swivel connector includes a substantially disklike contact disk 10 having a substantially flat face 11 encircling a bore 12 that is formed within a hub 13 which projects from the opposite face 14 of the contact disk. The bore 12 extends from the face side 11 but terminates short of the end of the hub to provide an annular flange 15 encircling a smaller axial opening 16. The flange 15 thus forms an inner shoulder 17 for seating a packing ring 18 to keep out dirt and dust. Also sleeved within the bore and abutting against the packing ring is a sleeve-like bushing 19 to mount the disk member on a spindle 20 which has a substantially disk-shaped head 21 at one end thereof having a contact face 22 conforming to the contact face 11 of the disk 10. The contact disk 10 is of larger diameter than the contact disk 21 so as to provide an annular marginal portion 23 for seating a cover cap 25 later described. The opposite end of the spindle projects through the opening 16 and has a slightly reduced threaded shank 26 that is adapted to be inserted in one of the openings 9 and secured in rigid contact with the fitting of the work member by jamb nuts 27 and 28 that are turned on the threaded shank to clampingly engage the respective inner and outer side faces of the fitting. The contact disk 10 has a substantially radial boss 30 on the hub side thereof to accommodate a threaded bore 31 for mounting a stud 32 having a terminal end 33' projecting radially from the contact disk to mount the apertured terminal 33 of the electrical ground conductor 6. The terminal of the ground conductor is retained in fixed contact with the end face 34 of the boss 30 by a jamb nut 35 that is threaded on the stud 32 and clamps a washer 36 against the opposite side of the terminal as shown in Fig. 3. The cap 25 comprises a disk-like portion 37 having the marginal portion curved inwardly over the marginal edge of the contact disk 21 in the form of an annular flange 38 which terminates in a circumferential rim 39 having a flat face 40 to seat against the marginal portion 23 of the disk member 10 and which is adapted to be clamped thereto by fastening devices such as bolts 41.

In order to retain the contact disks 10 and 21 with the faces 11 and 22 thereof in electrical contact, the cap member carries an axial boss 45 that extends outwardly therefrom and which is provided with a bore 46 terminating in a shoulder 47 for seating a coil spring 48 which has its opposite end bearing against a ball 49 that is seated in a conical recess 50 formed in the axial center of the disk member 21. The spring thus bears against the ball and provides pressure to maintain the desired electrical contact between the disk members. In order to provide the connector with a lubricant to facilitate turning of the ball relatively to the disk and turning of the contact surfaces one relatively to the other, the end of the boss 45 is provided with a threaded opening 51 for mounting a grease fitting 52 through which lubricant is injected and which is of a non-insulating type so as to not interfere with the electrical contact between the engaging surfaces of the contact disks. Some of the lubricant will also pass into the bore of the bushing for lubricating the bushing relatively to the spindle.

In using the device, the threaded shank 26 is passed through one of the openings 9 of the fitting 7 and is clamped therein by application of the nut 28. Both nuts 27 and 28 may be adjusted to properly clamp the threaded shank to the fitting. One or more ground conductors 6 may be connected to the terminal end 33' of the stud 32. A suitable lubricant as above described is inserted through the grease fitting so that the space between the cap member 25 and disk 21 is filled. A portion of this lubricant passes between the contact faces and into the bearing sleeve. Therefore, when the vessel 1 is turned in the welding process the cap 25 and contact disk member 10 remain stationary while the shank carried by the tank and the disk 21 turns freely with movement of the tank so as to prevent twisting and turning of the ground conductor cables.

From the foregoing it is obvious that I have provided a ground connector which is of simple construction and which provides adequate contact area between the swivel elements to carry the required current. It is also obvious that the structure permits substantially free turning of the inner contact disk 21 relatively to the contact disk 10 without twisting of the ground cable.

What I claim and desire to secure by Letters Patent is:

1. A ground connector for conducting a welding current including substantially disk-shaped electrical conductive members having contacting faces arranged in a contact plane extending transversely of axes of said disk-shaped members to carry a welding current therebetween, a spindle coaxially connected with one of said conductive members, a hub extending coaxially of the other conductive member and rotatable on said spindle to support said faces relatively rotatable in said contact plane, means on said spindle for anchoring the spindle in electrical contact with a workpiece to be welded, means on said other conductive member for connecting a ground conductor, and yielding means carried by one of said conductive members and bearing against the other of said conductive members to maintain said face contact.

2. A ground connector for conducting a welding current including substantially disk-shaped electrical conductive members having contacting faces arranged in a contact plane extending transversely of axes of said disk-shaped members to carry a welding current therebetween, a spindle coaxially connected with one of said conductive members, a hub extending coaxially of the other conductive member and rotatable on said spindle to support said faces relatively rotatable in said contact plane, means on said spindle for anchoring the spindle in electrical contact with a workpiece to be welded, means on said other conductive member for connecting a ground conductor, a cap member carried by said conductive member having the ground contact for enclosing said member having the spindle, a spring in said cap member, and a ball carried by the spring and bearing against said conductive member having the spindle to maintain said face contact.

3. A ground connector for conducting a welding current including substantially disk-shaped electrical conductive members having contacting faces arranged in a contact plane extending transversely of axes of said disk-shaped members to carry a welding current therebetween, a spindle coaxially connected with one of the conductive members, a hub extending coaxially of the other conductive member and rotatable on said spindle to support said faces relatively rotatable in said contact plane, means on said spindle for anchoring the spindle in electrical contact with a workpiece to be welded, means on said other conductive member for connecting a ground conductor, a cap member carried by said conductive member having the ground contact for enclosing said member having the spindle, a spring in said cap member, a ball carried by the spring and bearing against said conductive member having the spindle to maintain said face contact, and means for admitting a lubricant into the cap member.

4. A ground connector for conducting a welding current including substantially disk-shaped electrical conductive members having contacting faces arranged in a contact plane extending transversely of axes of said disk-shaped conductive members to carry a welding current therebetween, a spindle coaxially connected with one of the conductive members, a hub extending coaxially of the other conductive member and rotatable on said spindle to support said faces relatively rotatable in said contact plane, a threaded shank extending coaxially from the spindle, nuts on said shank for anchoring said spindle in electrical contact with a workpiece to be welded, means on said other conductive member for connecting a ground conductor, a cap member cooperating with the conductive member having the ground conductor for enclosing said conductive member having the spindle, and means in said cap member and bearing against the conductive member having the spindle to maintain said relative rotatable contact of said faces.

GWYNNE RAYMOND.

REFERENCES CITED

The following references are of record in the file of this patent:

UNITED STATES PATENTS

| Number | Name | Date |
|---|---|---|
| 1,433,331 | Angstrom | Oct. 24, 1922 |
| 1,669,653 | Campbell | May 15, 1928 |
| 2,104,800 | Grandy | Jan. 11, 1938 |
| 2,280,111 | Widell | Apr. 21, 1942 |